United States Patent
Heinl et al.

(10) Patent No.: US 9,227,174 B2
(45) Date of Patent: Jan. 5, 2016

(54) POROUS ALUMINUM OXIDE

(75) Inventors: Roland Heinl, Marktredwitz (DE); Peter Schröter, Wunsiedel (DE); Klaus Stöckl, Röslau (DE)

(73) Assignee: CeramTec GmbH, Plochingen (DE)

( * ) Notice: Subject to any disclaimer, the term of this patent is extended or adjusted under 35 U.S.C. 154(b) by 0 days.

(21) Appl. No.: 14/112,777

(22) PCT Filed: Apr. 23, 2012

(86) PCT No.: PCT/EP2012/057389
§ 371 (c)(1),
(2), (4) Date: Oct. 18, 2013

(87) PCT Pub. No.: WO2012/143557
PCT Pub. Date: Oct. 26, 2012

(65) Prior Publication Data
US 2014/0038819 A1 Feb. 6, 2014

(30) Foreign Application Priority Data
Apr. 21, 2011 (DE) .......... 10 2011 007 916

(51) Int. Cl.
| | |
|---|---|
| C01F 7/02 | (2006.01) |
| B01J 21/04 | (2006.01) |
| B01J 35/02 | (2006.01) |
| B01J 37/00 | (2006.01) |
| C04B 38/06 | (2006.01) |
| B01J 37/08 | (2006.01) |
| B01J 35/00 | (2006.01) |
| B01J 35/10 | (2006.01) |
| C04B 35/111 | (2006.01) |
| C04B 111/00 | (2006.01) |

(52) U.S. Cl.
CPC ............ *B01J 21/04* (2013.01); *B01J 35/002* (2013.01); *B01J 35/02* (2013.01); *B01J 35/023* (2013.01); *B01J 35/109* (2013.01); *B01J 35/1009* (2013.01); *B01J 37/0009* (2013.01); *B01J 37/0018* (2013.01); *B01J 37/08* (2013.01); *C04B 35/111* (2013.01); *C04B 38/06* (2013.01); *C01F 7/02* (2013.01); *C01F 7/021* (2013.01); *C01F 7/025* (2013.01); *C01F 7/027* (2013.01); *C04B 2111/0081* (2013.01); *C04B 2235/3218* (2013.01); *C04B 2235/3282* (2013.01); *C04B 2235/5409* (2013.01); *C04B 2235/5436* (2013.01); *C04B 2235/5445* (2013.01); *C04B 2235/5472* (2013.01); *C04B 2235/783* (2013.01)

(58) Field of Classification Search
CPC ............ C01F 7/20; C01F 7/021; C01F 7/027; C01F 7/025
USPC ......................................... 423/625, 628, 629
See application file for complete search history.

(56) References Cited

U.S. PATENT DOCUMENTS

| | | | | |
|---|---|---|---|---|
| 5,266,548 | A * | 11/1993 | Koradia et al. ............... | 502/439 |
| 5,935,896 | A | 8/1999 | Dupuis et al. | |
| 6,284,694 | B1 | 9/2001 | Moeltgen et al. | |
| 7,169,198 | B2 | 1/2007 | Moeltgen et al. | |
| 2003/0162655 | A1 | 8/2003 | Szymanski et al. | |

FOREIGN PATENT DOCUMENTS

| | | |
|---|---|---|
| DE | 196 02 525 A1 | 8/1997 |
| EP | 0 805 146 A1 | 11/1997 |
| WO | 01/79135 A1 | 10/2001 |

* cited by examiner

*Primary Examiner* — Matthew E Hoban
*Assistant Examiner* — James Fiorito
(74) *Attorney, Agent, or Firm* — Norton Rose Fulbright US LLP

(57) ABSTRACT

The invention relates to a substrate material, which is highly porous and which is provided with a mechanically stable, component-penetrating framework structure made of alpha-$Al_2O_3$, to methods for producing the substrate material, and to the use of the substrate material.

21 Claims, No Drawings

POROUS ALUMINUM OXIDE

This application is a §371 of International Application No. PCT/EP2012/057389 filed Apr. 23, 2012, and claims priority from German Patent Application No. 10 2011 007 916.5 filed Apr. 21, 2011.

The invention relates to porous aluminum oxide, methods for producing same, and use thereof.

Porous aluminum oxide is often used as substrate material for filtration applications or as a substrate material for catalysts (catalyst support). In the use as a catalyst support, in particular as a substrate material for gas phase reactions of ethylene to produce ethylene oxide, a high-porosity $Al_2O_3$ ceramic is usually used. However, the requirement for the highest porosity possible conflicts with the desire for the most solid substrates possible, i.e., substrates with low abrasion. For gas phase reactions, in addition a certain specific surface (BET 0.5 to 1.3 $m^2/g$) and the lowest possible diffusion resistance in penetrating the reactants are necessary. A multimodal (at least bimodal) pore distribution characteristic promotes the diffusion behavior. The chemical composition may vary according to the prior art; however, alpha-$Al_2O_3$ substrates have proven successful in practice. In addition, reference is made to accompanying elements which may adversely affect the selectivity, such as a high $SiO_2$ content.

In the production of porous framework structures, the required sintering process is usually not maintained until the compression, and instead is interrupted. An increase in the porosity is often achieved using organic additives having a placeholder function. Pore distributions are thus obtained which are directly related to the grain sizes of the raw materials used. Large pore channels are thus preferably produced using large grains (see US 2003/162655). However, the use of large grains results in small specific surfaces and low mechanical stability, provided that no appreciable secondary phase quantity is added. In addition, larger quantities of organic additives do not fundamentally alter this behavior, since the framework structure is composed of $Al_2O_3$.

The object of the present invention, therefore, is to provide a substrate material for filtration applications or for catalysts (catalyst support), for example, which does not have the disadvantages of the prior art. The object of the present invention in particular is to provide a substrate material for filtration applications or for catalysts (catalyst support), for example, having a framework structure with the highest possible mechanical stability.

According to the invention, this object is achieved by a substrate material having the characterizing features of the main claim. The substrate material according to the invention has the highest possible $Al_2O_3$ content. Preferred embodiments are characterized in the subclaims.

The substrate material according to the invention contains 90% to almost 100% by weight, preferably 92 to 98% by weight, particularly preferably above 98% by weight, of $Al_2O_3$, based on the sum of all inorganic components. According to the invention, all known $Al_2O_3$ phases are usable in principle. Preferably used according to the invention are alpha-$Al_2O_3$ as well as $Al_2O_3$ precursors, for example $Al(OH)_3$, AlOOH, or transition aluminas. The substrate material according to the invention may contain trace impurities, depending on the raw material. The substrate material according to the invention preferably contains less than less than 0.05% by weight of $TiO_2$, less than 0.2% by weight but greater than 0.02% by weight, in particular less than 0.1% by weight but greater than 0.02% by weight, of $Na_2O$, and/or less than 1% by weight, in particular less than 0.6% by weight, of $SiO_2$.

The substrate material according to the invention has a highly porous, mechanically stable, component-penetrating framework structure; this mechanically stable framework structure according to the invention which imparts mechanical strength to the substrate material is achieved according to the invention not by a large secondary phase quantity, but, rather, by a specialized sintering technique coupled with a particular raw material selection of the quantities and grain sizes to be used. These measures allow the highly porous, mechanically stable, component-penetrating framework structure intended according to the invention.

The selection of the aluminum oxides to be used and of the quantities and grain sizes of organic substances to be used is essential to the invention, since, in addition to slight shrinkage due to relatively coarse $Al_2O_3$ having grain sizes of 3 to 5 μm, fine-grained $Al_2O_3$ having grain sizes of 0.3 to 1 μm is also necessary for achieving the sintering and the mechanical stability, as well as for achieving a defined specific surface according to the invention.

Tests have shown that the use of $Al_2O_3$ precursors, for example $Al(OH)_3$, AlOOH, or transition aluminas, is particularly advantageous for the high mechanical stability required according to the invention.

According to the invention, the highly porous, mechanically stable, component-penetrating framework composed of alpha-$Al_2O_3$ is formed by the use of certain additives in the production of the substrate material according to the invention. The additives selected according to the invention which are responsible for the pore formation, referred to below as pore-forming agents, play a special role in this regard.

Pore-forming agents of the inorganic as well as the organic type having certain grain sizes are materials which are added to the starting mixture, and which after the sintering and firing are completely removed from the substrate and completely burned off, thus providing a controlled porosity in the substrate material according to the invention. Examples of materials which may be used as pore-forming agents include carbon-containing materials such as carbon powder and graphite, powdered plastics such as polyethylene, polystyrene, and polycarbonate, resin, starch, cellulose and materials based on cellulose, wood flours, and other plant materials such as ground nut shells, for example pecan, cashew, walnut, and hazelnut shells. In addition, certain binders based on carbon may be used as pore-forming agents. Preferred pore-forming agents are organic pore-forming agents in non-swellable form, in particular materials derived from cellulose, such as ground nut shells, preferably walnut shell flour.

According to the invention, coarse organic components, preferably walnut shell flour having a relative grain size of 10 to 20 μm maximum and/or having a relative grain size of 100 to 500 μm maximum, are preferred in the production. The highly porous, mechanically stable, cohesive, component-penetrating framework structure of the alpha-$Al_2O_3$ obtained according to the invention, similar to a secondary phase, is situated in the gaps in the additive component, thus forming a second component-penetrating framework.

For producing an extrudable starting mixture for the substrate material according to the invention, binders known per se are used according to the invention, for example celluloses, substituted celluloses such as methylcellulose, ethylcellulose, and carboxyethylcellulose, stearates such as organic stearates, for example methyl stearate or ethyl stearate, waxes, polyolefin oxides, and mixtures of such binders or similar substances. According to the invention, water-swellable organic binders are preferred.

For minimizing the friction forces in the production of the substrate material according to the invention, lubricants may be used, for example colloidal silicic acid dispersions, waxes, and/or refined mineral oils.

The starting components selected according to the invention are mixed to form an extrudable compound, and the extrudable compound is subsequently molded into, for example, cylinders, rings, or similar shapes using suitable cutting and drying processes. Ring-shaped geometries may have, for example, an external diameter of 6 to 9.5 mm, an internal diameter of 2 to 5 mm, and a length of 5 to 9.5 mm. The molded bodies thus obtained are then sintered in the temperature range between 1350° C. and 1550° C. with residence times of 1 h to 10 h, preferably at temperatures of 1480° C. and with a residence time of 2 h.

The substrate material according to the invention thus obtained is highly porous and is provided with a mechanically stable, component-penetrating framework structure composed of alpha-$Al_2O_3$, and achieves the object of the invention.

The substrate material according to the invention preferably contains up to 30 to 90% by weight (based on the sum of all inorganic components) of a first alpha-$Al_2O_3$ component having a primary crystal grain size of 1 to 3 μm and an agglomerate size of 3 to 5 μm, and up to 10 to 70% by weight (based on the sum of all inorganic components) of a second alpha-$Al_2O_3$ component having a primary crystal grain size of 0.3 to 1 μm and an agglomerate size of 0.5 to 1 μm.

In another preferred embodiment, the highly porous substrate material according to the invention which is provided with a mechanically stable, component-penetrating framework structure contains, in addition to the first and second alpha-$Al_2O_3$ component, up to 50% by weight (based on the sum of all inorganic components) of an $Al_2O_3$ component which has been formed in situ from an $Al_2O_3$ precursor material during the production, preferably from $Al(OH)_3$, AlOOH, or transition aluminas, particularly preferably from $Al(OH)_3$ having a grain size of 1.3 μm.

In another preferred embodiment, the highly porous substrate material according to the invention which is provided with a mechanically stable, component-penetrating framework structure has a multimodal pore structure with high porosity, and at the same time has high mechanical strength.

In another preferred embodiment, the highly porous substrate material according to the invention which is provided with a mechanically stable, component-penetrating framework structure has a specific surface (measured according to BET) of 0.5 to 1.3 $m^2/g$, in particular a specific surface of 0.5 to 0.95 $m^2/g$.

In another preferred embodiment of the highly porous substrate material according to the invention which is provided with a mechanically stable, component-penetrating framework structure, the weight loss, determined as a measure of the abrasion resistance according to ASTM D 4058-81, is 5 to 40%.

In another preferred embodiment, the highly porous substrate material according to the invention which is provided with a mechanically stable, component-penetrating framework structure may absorb water in quantities between 41% and 60% (measured according to ASTM C 373-56).

In another preferred embodiment, the highly porous substrate material according to the invention which is provided with a mechanically stable, component-penetrating framework structure has breaking forces of greater than 50 N (determined in the vertex pressure process).

In another preferred embodiment, the highly porous substrate material according to the invention which is provided with a mechanically stable, component-penetrating framework structure has a pore diameter distribution curve (measured by mercury intrusion porosimetry) which has a relative maximum between 0.3 and 1.3 μm and another relative maximum between 15 and 60 μm.

In another preferred embodiment, the highly porous substrate material according to the invention which is provided with a mechanically stable, component-penetrating framework structure has further pore diameter maxima in the range of 100 to 500 μm in addition to the relative maxima which are determinable by mercury intrusion porosimetry.

In another preferred embodiment, the highly porous substrate material according to the invention which is provided with a mechanically stable, component-penetrating framework structure has a $TiO_2$ content of less than 0.05% by weight.

In another preferred embodiment, the highly porous substrate material according to the invention which is provided with a mechanically stable, component-penetrating framework structure has an $Na_2O$ content of less than 0.2% by weight but greater than 0.02% by weight, in particular less than 0.1% by weight but greater than 0.02% by weight.

In another preferred embodiment, the highly porous substrate material according to the invention which is provided with a mechanically stable, component-penetrating framework structure has an $SiO_2$ content of less than 1% by weight, in particular less than 0.6% by weight, of $SiO_2$.

The present invention further relates to a method for producing the substrate material according to the invention which is provided with a mechanically stable, component-penetrating framework structure, in which, based on the sum of all inorganic components, 90 to almost 100% by weight, preferably 92 to 98% by weight, particularly preferably greater than 98% by weight, of $Al_2O_3$, between 5% by weight and 60% by weight of organic pore-forming agents in non-swellable form, between 0.5% by weight and 3% by weight of water-swellable organic binders, between 0.5% by weight and 5% by weight of organic liquids for minimizing the friction forces, and between 10% by weight and 30% by weight of water are mixed to form an extrudable compound, the extrudable compound is subsequently molded into, for example, cylinders, rings, or similar shapes using suitable cutting and drying processes, and the molded bodies thus obtained are sintered in the temperature range between 1350° C. and 1550° C. with residence times of 1 h to 10 h, preferably at temperatures of 1480° C. and with a residence time of 2 h.

A method for producing the substrate material according to the invention which is provided with a mechanically stable, component-penetrating framework structure is particularly preferred in which alpha-$Al_2O_3$, $Al_2O_3$ precursors, for example $Al(OH)_3$, AlOOH, or transition aluminas, or mixtures of these $Al_2O_3$ components is/are used as $Al_2O_3$.

A method for producing the substrate material according to the invention which is provided with a mechanically stable, component-penetrating framework structure is also preferred in which one or more organic pore-forming agents having a relative grain size of 10 to 20 μm maximum and/or having a relative grain size of 100 to 500 μm maximum are used as organic pore-forming agents.

A method for producing the substrate material according to the invention which is provided with a mechanically stable, component-penetrating framework structure is also preferred in which the organic pore-forming agents are selected from starch, walnut shell flour, pecan shell flour, polystyrene, polyethylene, polycarbonate, cellulose, wood flour, or carbon.

A method for producing the substrate material according to the invention which is provided with a mechanically stable, component-penetrating framework structure is also preferred in which the extrudable compound is molded into ring-shaped geometries using suitable cutting and drying processes, the ring-shaped geometries having, for example, an external diameter of 6 to 9.5 mm, an internal diameter of 2 to 5 mm, and a length of 5 to 9.5 mm.

The present invention further relates to the use of the substrate material according to the invention which is provided with a mechanically stable, component-penetrating framework structure as a catalyst support, as a catalyst support for ethylene oxide synthesis, for filtration purposes, and/or for filtration purposes for solid/liquid separation.

The examples listed in Table 1 and identified by Ex 1 through Ex 5 are intended to explain the present invention in greater detail without limiting same. The examples listed in Table 2 and identified by Comp 1 through Comp 5 are not according to the invention, but, rather, are used for comparison.

TABLE 1

| Raw material | Ex 1 | Ex 2 | Ex 3 | Ex 4 | Ex 5 | Raw material characteristic |
|---|---|---|---|---|---|---|
| $Al_2O_3$ (1) | 50 | 50 | 50 | 40 | 50 | $Al_2O_3$, primary grain: 2 μm, agglomerate: 4 μm, BET: 1.2 $m^2/g$ |
| $Al_2O_3$ (2) | 20 | 50 | 0 | 30 | 10 | $Al_2O_3$, primary grain: 0.5 μm, agglomerate: 0.7 μm, BET: 7 $m^2/g$ |
| Spray powder | 0 | 0 | 0 | 0 | 0 | Spray powder composed of $Al_2O_3$ (1) (80) + $Al_2O_3$ (2) (20) + cornstarch (33) |
| $Al(OH)_3$ | 30 | 0 | 50 | 30 | 40 | $Al(OH)_3$, primary grain: 1.3 μm, BET 3.5 $m^2/g$ |
| $Al_2O_3$ (3) | 0 | 0 | 0 | 0 | 0 | $Al_2O_3$, primary grain: 1.2 μm, agglomerate: 1.4 μm, BET 3.7 $m^2/g$ |
| $Al_2O_3$ (4) | 0 | 0 | 0 | 0 | 0 | $Al_2O_3$, primary grain 2 μm, agglomerate: 80 μm, BET 1 $m^2/g$ |
| Cornstarch | 0 | 0 | 0 | 0 | 0 | Cornstarch, organic pore-forming agent, 15 μm particles |
| Cellulose | 0 | 0 | 0 | 0 | 0 | Cellulose, organic pore-forming agent, 120 μm particles |
| Walnut shell flour 1 | 37.5 | 56.2 | 25 | 37.5 | 37.8 | Walnut shell flour, organic pore-forming agent, 300 μm particles |
| Walnut shell flour 2 | 0 | 0 | 0 | 0 | 0 | Walnut shell flour, organic pore-forming agent, 180 μm particles |
| Wax | 0 | 0 | 0 | 3.1 | 3.1 | Diamide wax, 15 μm particles |
| Cellulose 2 | 1.9 | 1.9 | 1.9 | 3.1 | 3.1 | Swellable cellulose, binder |
| $SiO_2$ dispersion | 0.38 | 0.38 | 0.38 | 0.38 | 0.38 | Colloidal silicic acid dispersion, 40% solids |
| Lubricant | 3.5 | 3.5 | 3.5 | 3.5 | 3.5 | Refined mineral oils, lubricant |
| Water | 27.5 | 32.5 | 30 | 30 | 31 | |
| Firing temperature/t | 1480° C./2 h | 1440° C./2 h | 1480° C./2 h | 1480° C./2 h | 1480° C./2 h | |
| Water absorption in % | 48 | 50 | 50 | 48 | 55 | See: ASTM C 373-56 |
| Weight loss in % | 22 | 25 | 21 | 18 | 24 | According to ASTM D 4058-81, 30 minutes |
| Breaking force in N | 100 | 130 | 97 | 100 | 90 | Vertex pressure process |
| BET | 0.9 | 0.7 | 0.9 | 0.9 | 1 | DIN ISO 9277 |
| d50 pores 1 in μm | 0.8 | 1 | 1.3 | 1 | 1.2 | By mercury intrusion porosimetry |
| d50 pores 2 in μm | 50 | 50 | 35 | 55 | 55 | By mercury intrusion porosimetry |

TABLE 2

| Raw material | Comp 1 | Comp 2 | Comp 3 | Comp 4 | Comp 5 | Raw material characteristic |
|---|---|---|---|---|---|---|
| $Al_2O_3$ (1) | 0 | 0 | 80 | 80 | 0 | $Al_2O_3$, primary grain: 2 μm, agglomerate: 4 μm, BET: 1.2 $m^2/g$ |
| $Al_2O_3$ (2) | 20 | 20 | 0 | 0 | 20 | $Al_2O_3$, primary grain: 0.5 μm, agglomerate: 0.7 μm, BET: 7 $m^2/g$ |
| Spray powder | 0 | 0 | 0 | 0 | 80 | Spray powder composed of $Al_2O_3$ (1) (80) + $Al_2O_3$ (2) (20) + cornstarch (33) |
| $Al(OH)_3$ | 0 | 0 | 0 | 20 | 0 | $Al(OH)_3$, primary grain: 1.3 μm, BET 3.5 $m^2/g$ |
| $Al_2O_3$ (3) | 0 | 0 | 20 | 0 | 0 | $Al_2O_3$, primary grain: 1.2 μm, agglomerate: 1.4 μm, BET 3.7 $m^2/g$ |
| $Al_2O_3$ (4) | 80 | 80 | 0 | 0 | 0 | $Al_2O_3$, primary grain 2 μm, agglomerate: 80 μm, BET 1 $m^2/g$ |
| Cornstarch | 12.5 | 0 | 12.5 | 12.5 | 7.5 | Cornstarch, organic pore-forming agent, 15 μm particles |
| Cellulose | 18.8 | 12.5 | 12.5 | 12.5 | 7.5 | Cellulose, organic pore-forming agent, 120 μm particles |
| Walnut shell flour 1 | 0 | 0 | 0 | 0 | 0 | Walnut shell flour, organic pore-forming agent, 300 μm particles |
| Walnut shell flour 2 | 0 | 12.5 | 12.5 | 18.8 | 0 | Walnut shell flour, organic pore-forming agent, 180 μm particles |

TABLE 2-continued

| Raw material | Comp 1 | Comp 2 | Comp 3 | Comp 4 | Comp 5 | Raw material characteristic |
|---|---|---|---|---|---|---|
| Wax | 0 | 0 | 0 | 0 | 0 | Diamide wax, 15 μm particles |
| Cellulose 2 | 2.5 | 5 | 2.5 | 2.5 | 6.2 | Swellable cellulose, binder |
| $SiO_2$ dispersion | 1.1 | 1.1 | 1.1 | 1.1 | 3.8 | Colloidal silicic acid dispersion, 40% solids |
| Lubricant | 3.5 | 3.5 | 3.5 | 3.5 | 3.2 | Refined mineral oils, lubricant |
| Water | 32.5 | 37.7 | 33.8 | 41.2 | 47 | |
| Firing temperature/t | 1480° C./2 h | 1440° C./2 h | 1440° C./2 h | 1440° C./2 h | 1440° C./2 h | |
| Water absorption in % | 44 | 52 | 44 | 59 | 53 | See: ASTM C 373-56 |
| Weight loss in % | 90 | 100 | 25 | 42 | 70 | According to ASTM D 4058-81, 30 minutes |
| Breaking force in N | 20 | 25 | 40 | 38 | 41 | Vertex pressure process |
| BET | 0.65 | 0.65 | 0.7 | 0.8 | 0.6 | DIN ISO 9277 |
| d50 pores 1 in μm | 1 | 0.6 | | | 1 | By mercury intrusion porosimetry |
| d50 pores 2 in μm | 7 | 10 | 5 | 6 | 8 | By mercury intrusion porosimetry |

The invention claimed is:

1. A substrate material comprising a mechanically stable, component-penetrating framework structure comprising of alpha-$Al_2O_3$, wherein the substrate material comprises inorganic components and has a multimodal pore structure, wherein the substrate material has a specific surface measured according to the BET method of from 0.5 to 1.3 m²/g, wherein the alpha-$Al_2O_3$ comprises from 30 to 90% by weight of a first alpha-$Al_2O_3$ component based on the sum of all inorganic components, wherein the first alpha-$Al_2O_3$ component has a primary crystal grain size of 1 to 3 μm and an agglomerate size of 3 to 5 μm, and from 10 to 70% by weight second alpha-$Al_2O_3$ component based on the sum of all inorganic components, wherein the second alpha-$Al_2O_3$ component has a primary crystal grain size of 0.3 to 1 μm and an agglomerate size of 0.5 to 1 μm.

2. The substrate material according to claim 1, wherein the alpha-$Al_2O_3$ comprises up to 50% by weight of an $Al_2O_3$ component based on the sum of all inorganic components, wherein the has been formed in situ from an $Al_2O_3$ precursor material during production of the substrate material.

3. The substrate material according to claim 2, wherein the $Al_2O_3$ precursor is selected from the group consisting of $Al(OH)_3$, AlOOH and a transition alumina.

4. The substrate material according to claim 1, wherein the specific surface is from 0.5 to 0.95 m²/g.

5. The substrate material according to claim 1, wherein weight loss after sintering, determined as a measure of the abrasion resistance according to ASTM D 4058-81, is from 5 to 40%.

6. The substrate material according to claim 1, wherein the substrate material absorbs water in quantities between 41% and 60% measured according to ASTM C 373-56.

7. The substrate material according to claim 1, wherein the substrate material has breaking forces of greater than 50 N determined in the vertex pressure process.

8. The substrate material according to claim 1, wherein the pore diameter distribution curve thereof measured by mercury intrusion porosimetry has a relative maximum between 0.3 and 1.3 μm and another relative maximum between 15 and 60 μm.

9. The substrate material according to claim 1, wherein the substrate material has further pore diameter maxima in the range of 100 to 500 μm in addition to a relative maxima determinable by mercury intrusion porosimetry.

10. The substrate material according to claim 1, wherein the substrate material has a $TiO_2$ content of less than 0.05% by weight.

11. The substrate material according to claim 1, wherein the substrate material has an $Na_2O$ content of less than 0.2% by weight but greater than 0.02% by weight.

12. The substrate material according to claim 1, wherein the substrate material has a $SiO_2$ content of less than 1% by weight.

13. A method for producing the substrate material of claim 1, comprising mixing $Al_2O_3$ together with an organic pore-forming agent in nonswellable form, a water-swellable organic binder, an organic liquid for minimizing friction, and water to form an extrudable compound,
molding the extrudable compound to form a molded body, and
sintering the molded body at a temperature in the range between 1350° C. and 1550° C. for 1 hour to 10 hours.

14. A method according to claim 13, wherein at least one $Al_2O_3$ precursor selected form the group consisting of $Al(OH)_3$, AlOOH and a transition aluminas is present as the $Al_2O_3$.

15. A method according to claim 13, wherein the organic pore-forming agent has a relative grain size of 10 to 20 μm maximum or having a relative grain size of 100 to 500 μm maximum.

16. A method according to claim 13, wherein the organic pore-forming agent is selected from the group consisting of starch, walnut shell flour, pecan shell flour, polystyrene, polyethylene, polycarbonate, cellulose, wood flour and carbon.

17. A method according to claim 13, wherein the extrudable compound is molded into ring-shaped geometries using suitable cutting and drying processes, the ring-shaped geometries having an external diameter of 6 to 9.5 mm, an internal diameter of 2 to 5 mm, and a length of 5 to 9.5 mm.

18. A catalyst support comprising the substrate material of claim 1.

19. A filter comprising the substrate material of claim 1 for filtration purposes.

20. The substrate material according to claim 9, wherein the substrate material has a $TiO_2$ content of less than 0.05% by weight.

21. The substrate material according to claim 6, wherein the substrate material has a $TiO_2$ content of less than 0.05% by weight.

* * * * *